Feb. 28, 1956   J. S. BURGE ET AL   2,736,358
APPARATUS FOR ATTACHING A TERMINAL CLIP TO A WIRE
Original Filed July 29, 1946   18 Sheets-Sheet 1

Inventors
JAMES S. BURGE, FLOYD J. FOUST
WILLARD C. SHAW
HILTON J. M<sup>c</sup> KEE
WARREN M. RIDER By
Attorney

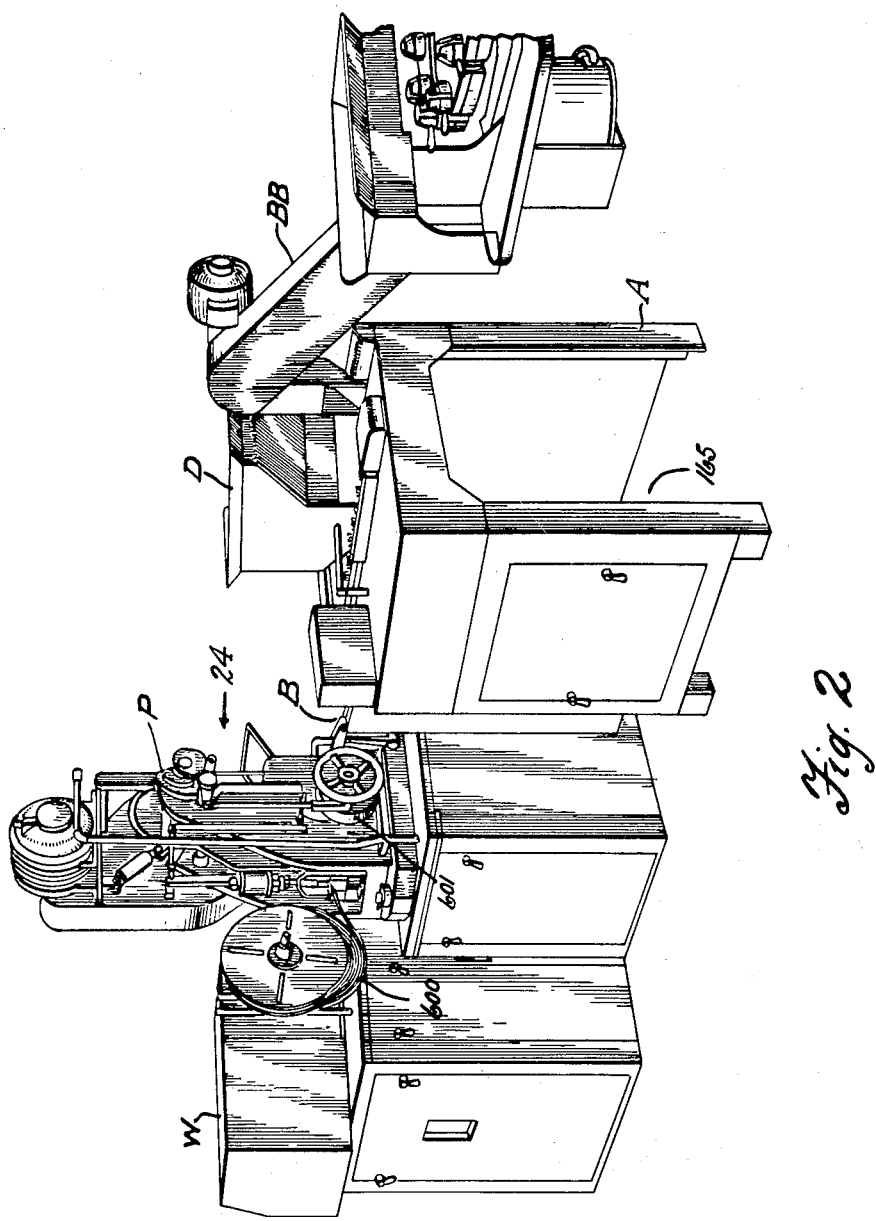

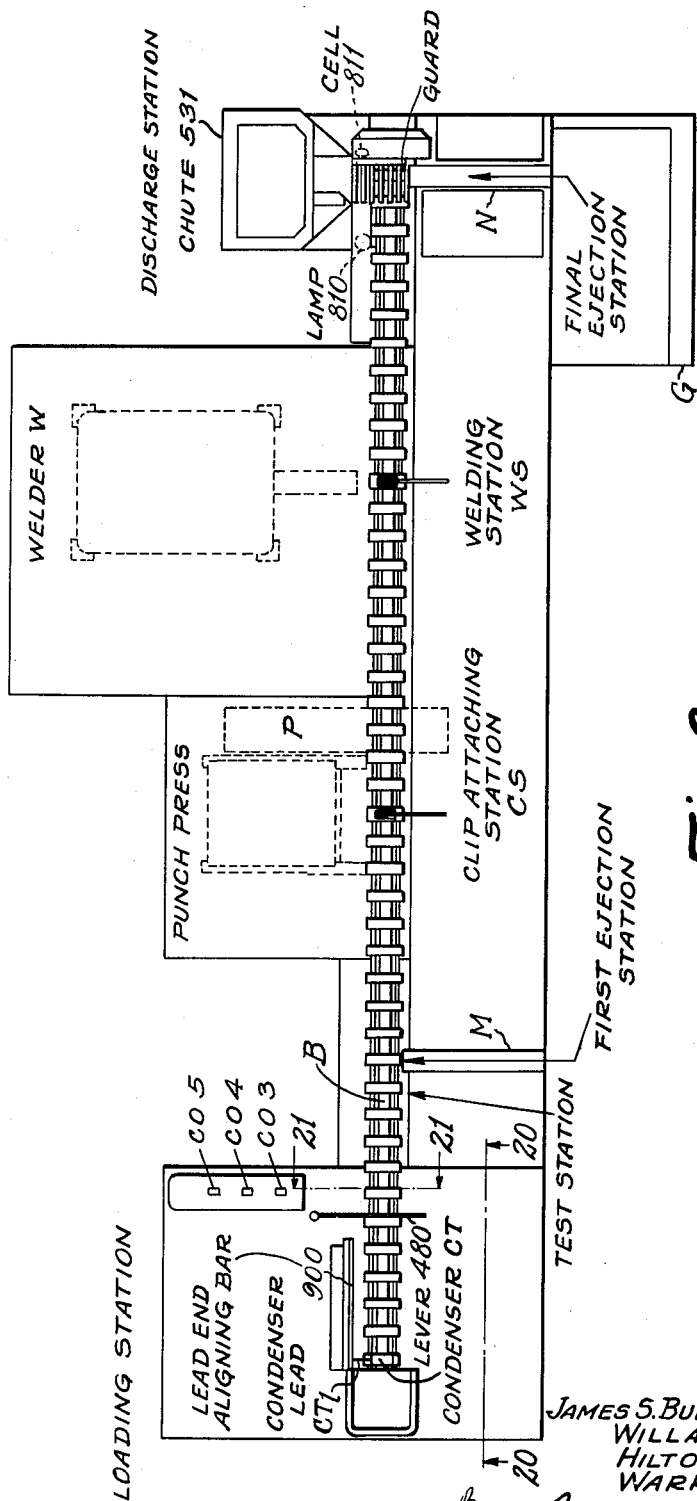

Feb. 28, 1956 J. S. BURGE ET AL 2,736,358
APPARATUS FOR ATTACHING A TERMINAL CLIP TO A WIRE
Original Filed July 29, 1946 18 Sheets-Sheet 4
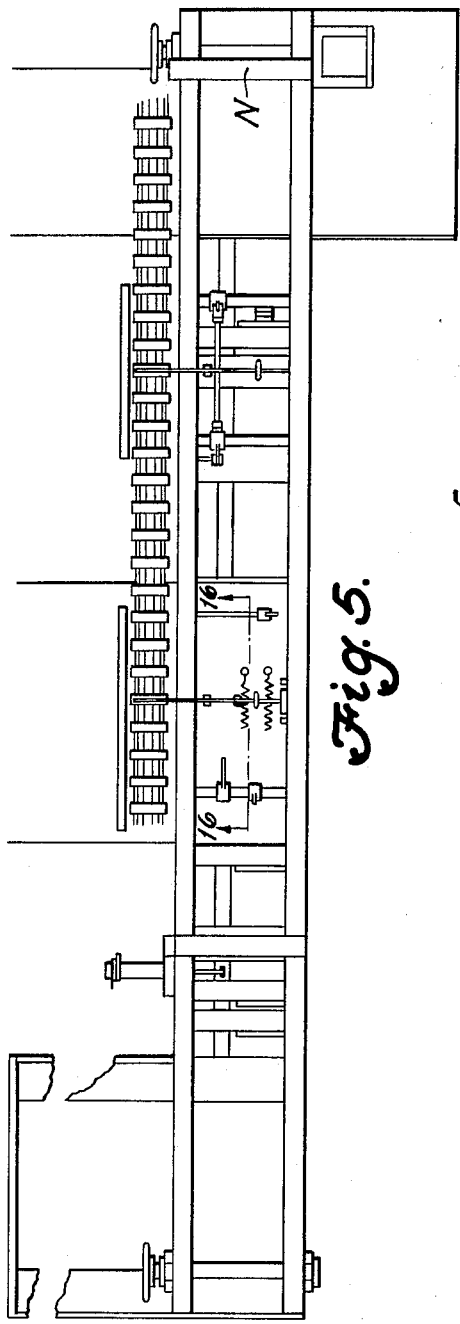
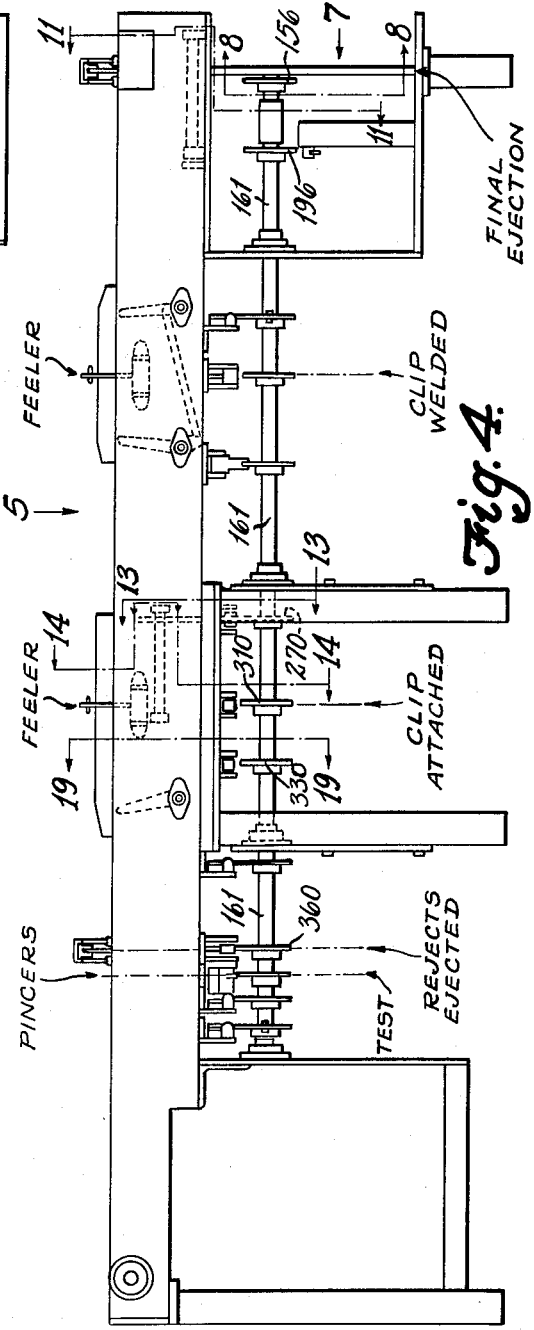
INVENTORS
JAMES S. BURGE, FLOYD J. FOUST
WILLARD C. SHAW
HILTON J. McKEE
WARREN M. RIDER
ATTORNEYS

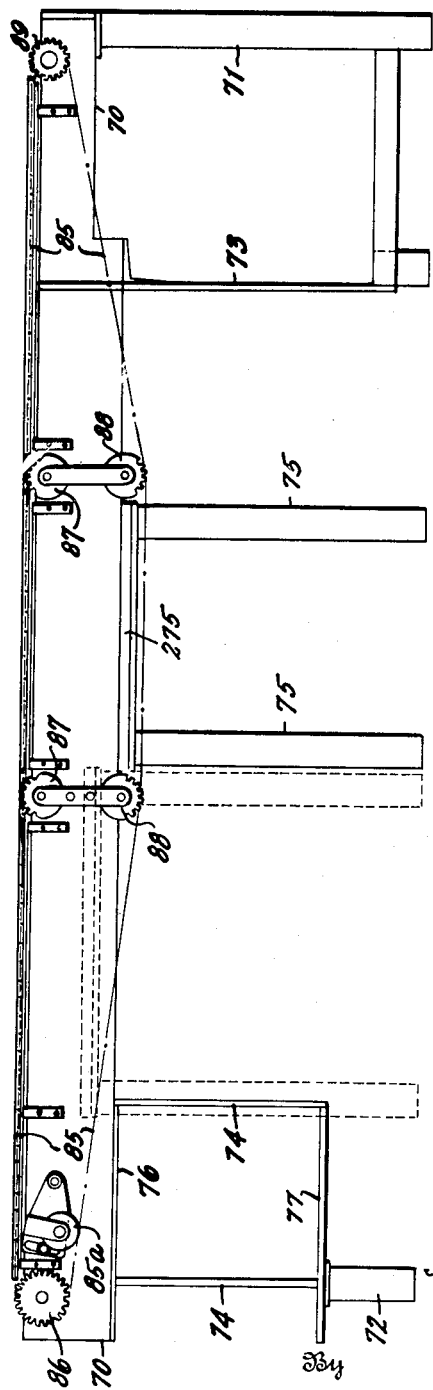

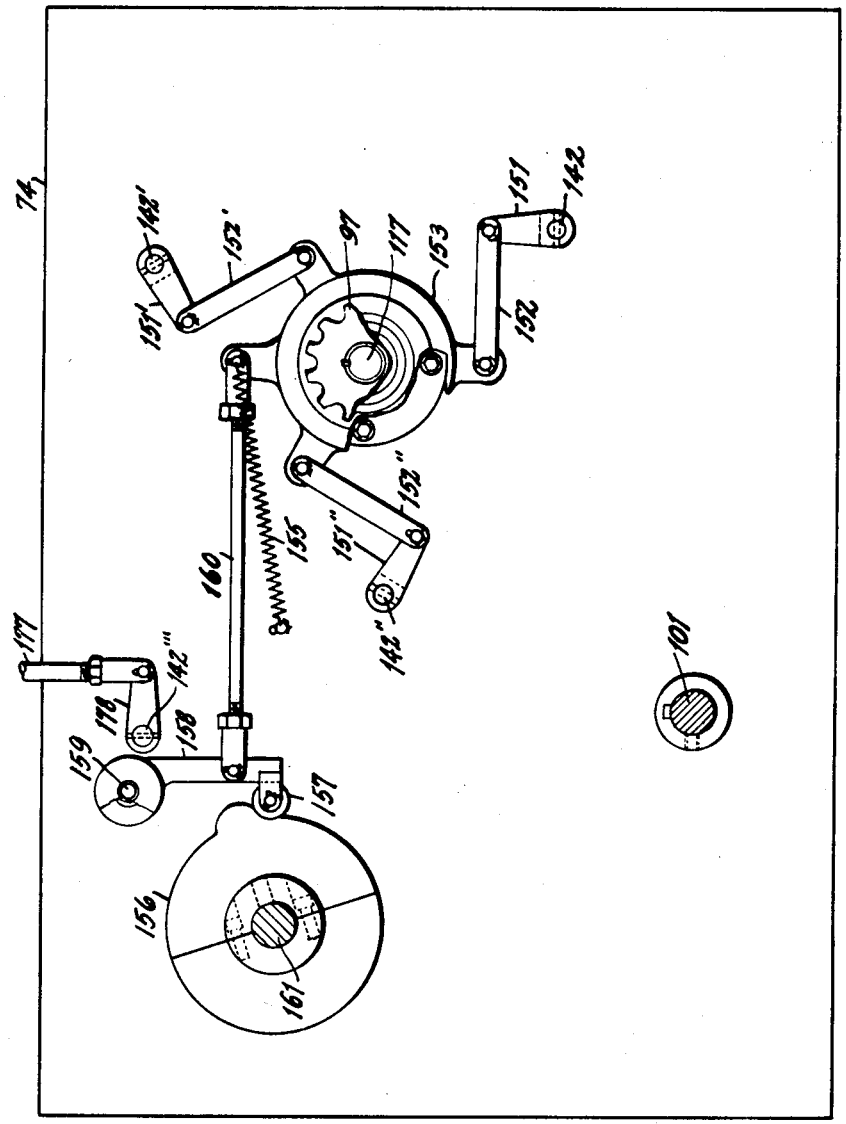

Feb. 28, 1956  J. S. BURGE ET AL  2,736,358
APPARATUS FOR ATTACHING A TERMINAL CLIP TO A WIRE
Original Filed July 29, 1946  18 Sheets-Sheet 8

Inventors
JAMES S. BURGE, FLOYD J. FOUST
WILLARD C. SHAW
HILTON J. McKEE
WARREN M. RIDER By
Attorney

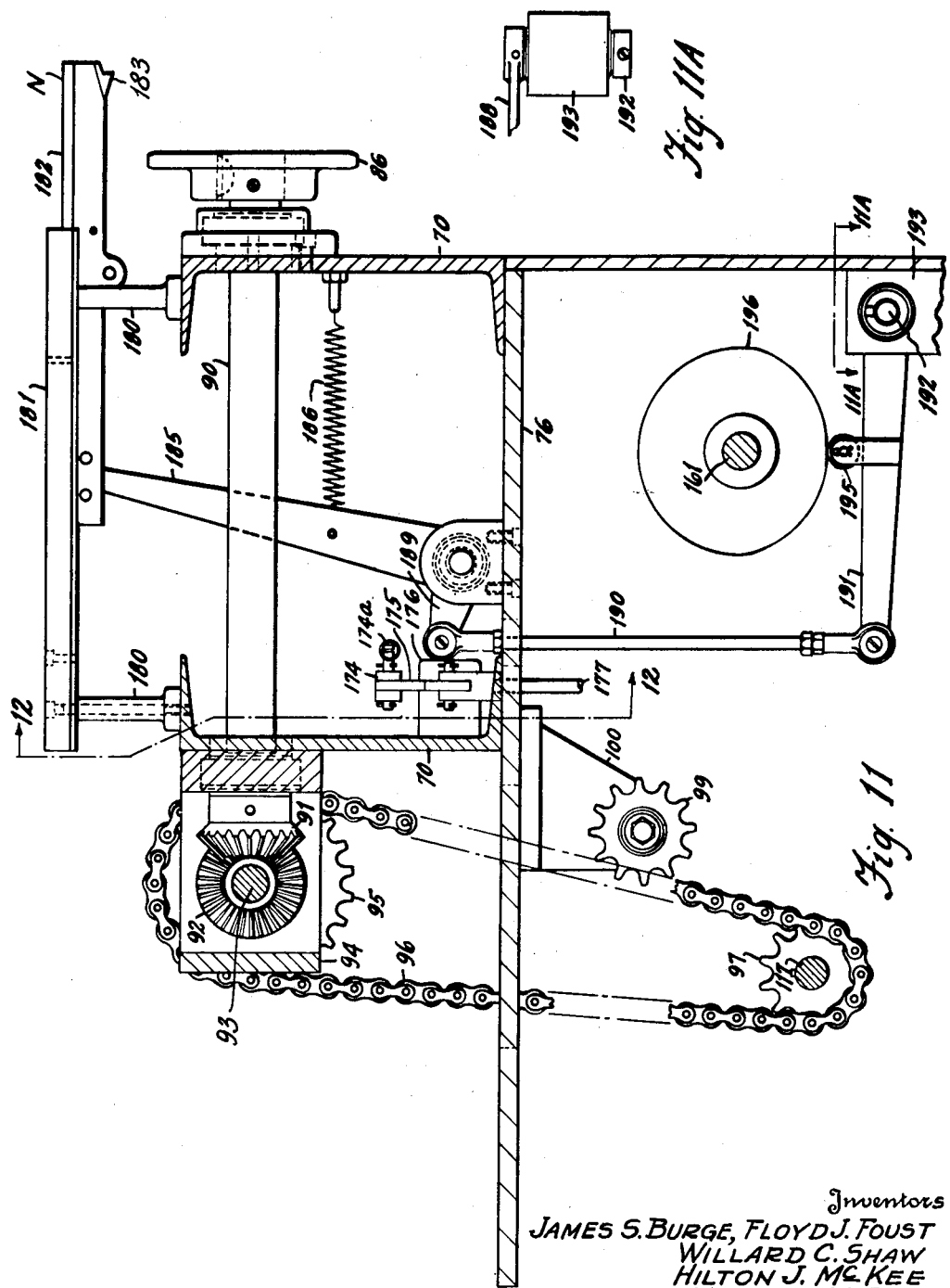

Feb. 28, 1956 J. S. BURGE ET AL 2,736,358
APPARATUS FOR ATTACHING A TERMINAL CLIP TO A WIRE
Original Filed July 29, 1946 18 Sheets-Sheet 10

Inventors
JAMES S. BURGE, FLOYD J. FOUST
WILLARD C. SHAW
HILTON J. McKEE
WARREN M. RIDER
By
Attorney Feb. 28, 1956   J. S. BURGE ET AL   2,736,358
APPARATUS FOR ATTACHING A TERMINAL CLIP TO A WIRE
Original Filed July 29, 1946   18 Sheets-Sheet 12
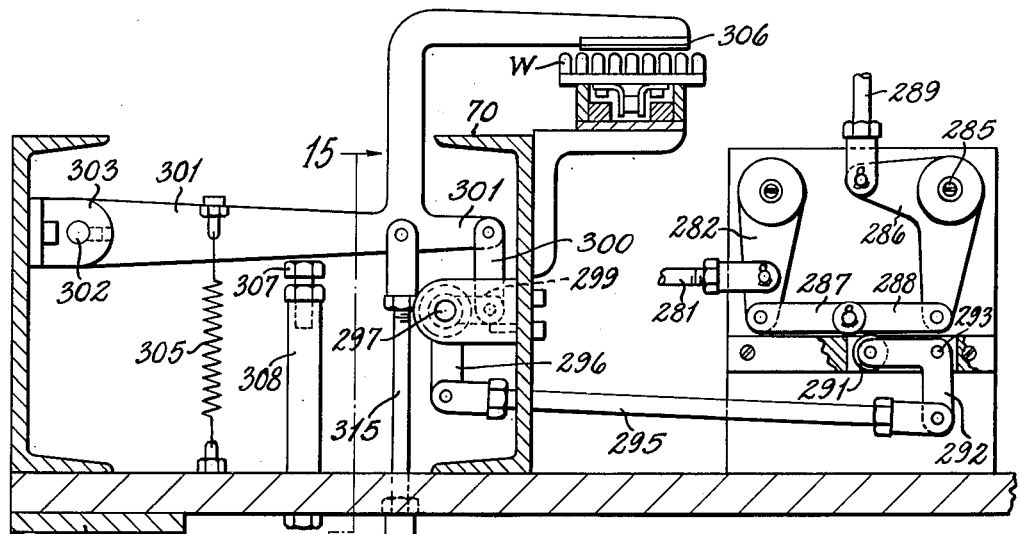
*Fig. 14*
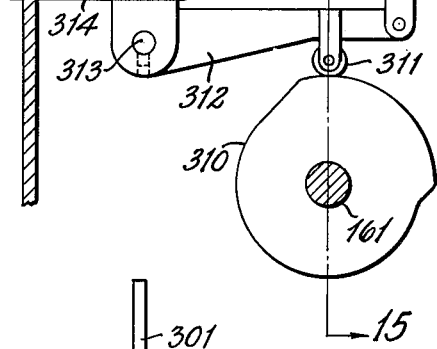
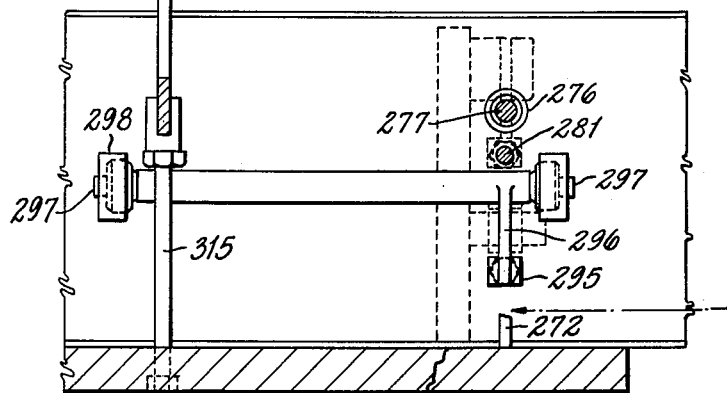
*Fig. 15.*
INVENTORS.
JAMES S. BURGE, FLOYD J. FOUST
WILLARD C. SHAW
HILTON J. McKEE
WARREN M. RIDER
ATTORNEYS
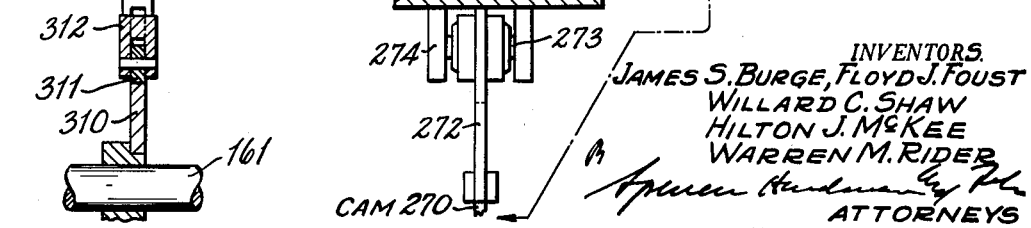

Feb. 28, 1956   J. S. BURGE ET AL   2,736,358
APPARATUS FOR ATTACHING A TERMINAL CLIP TO A WIRE
Original Filed July 29, 1946   18 Sheets-Sheet 13
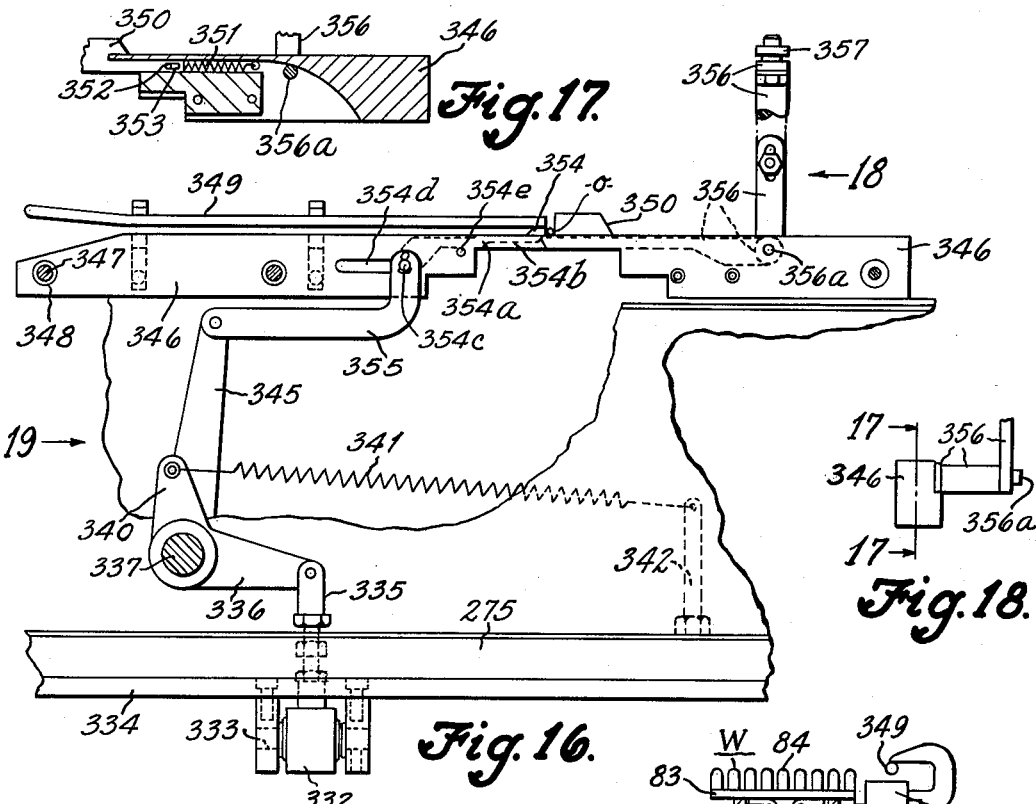
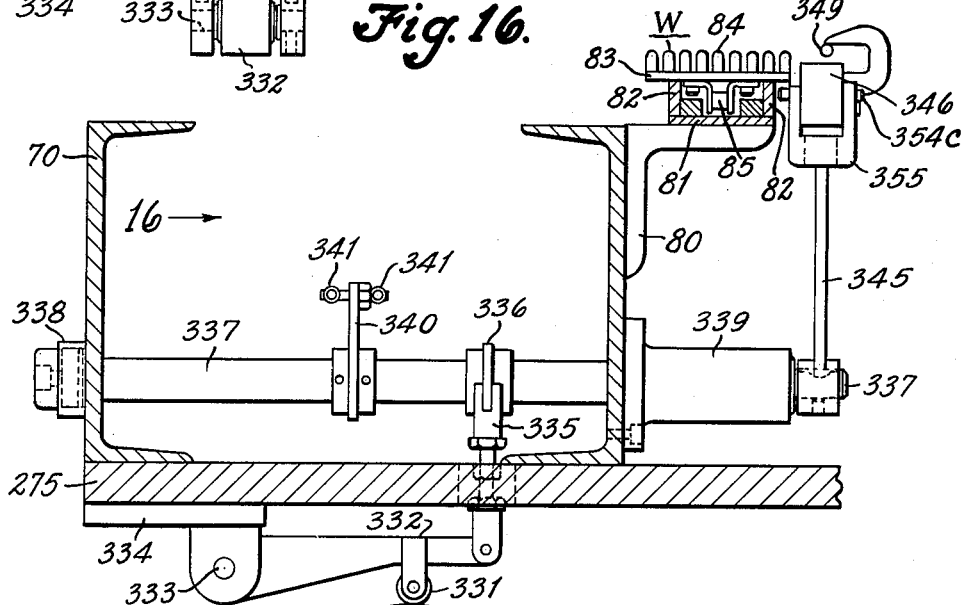
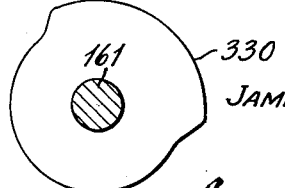
INVENTORS.
JAMES S. BURGE, FLOYD J. FOUST
WILLARD C. SHAW
HILTON J. McKEE
WARREN M. RIDER
ATTORNEYS

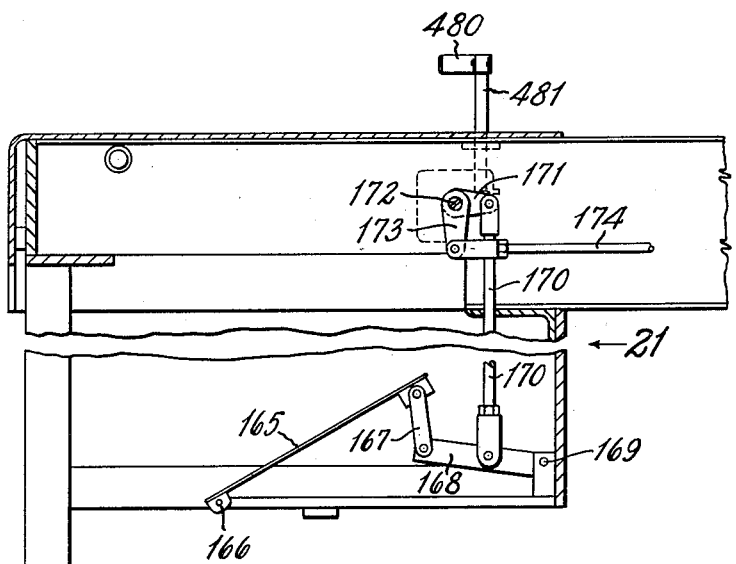
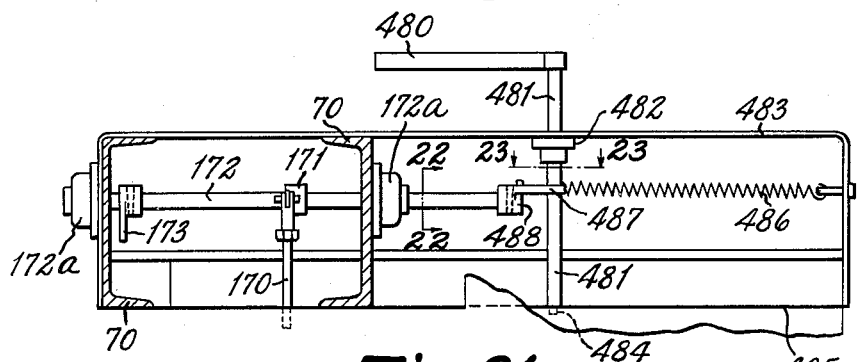
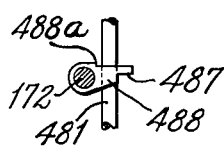
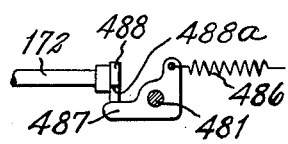

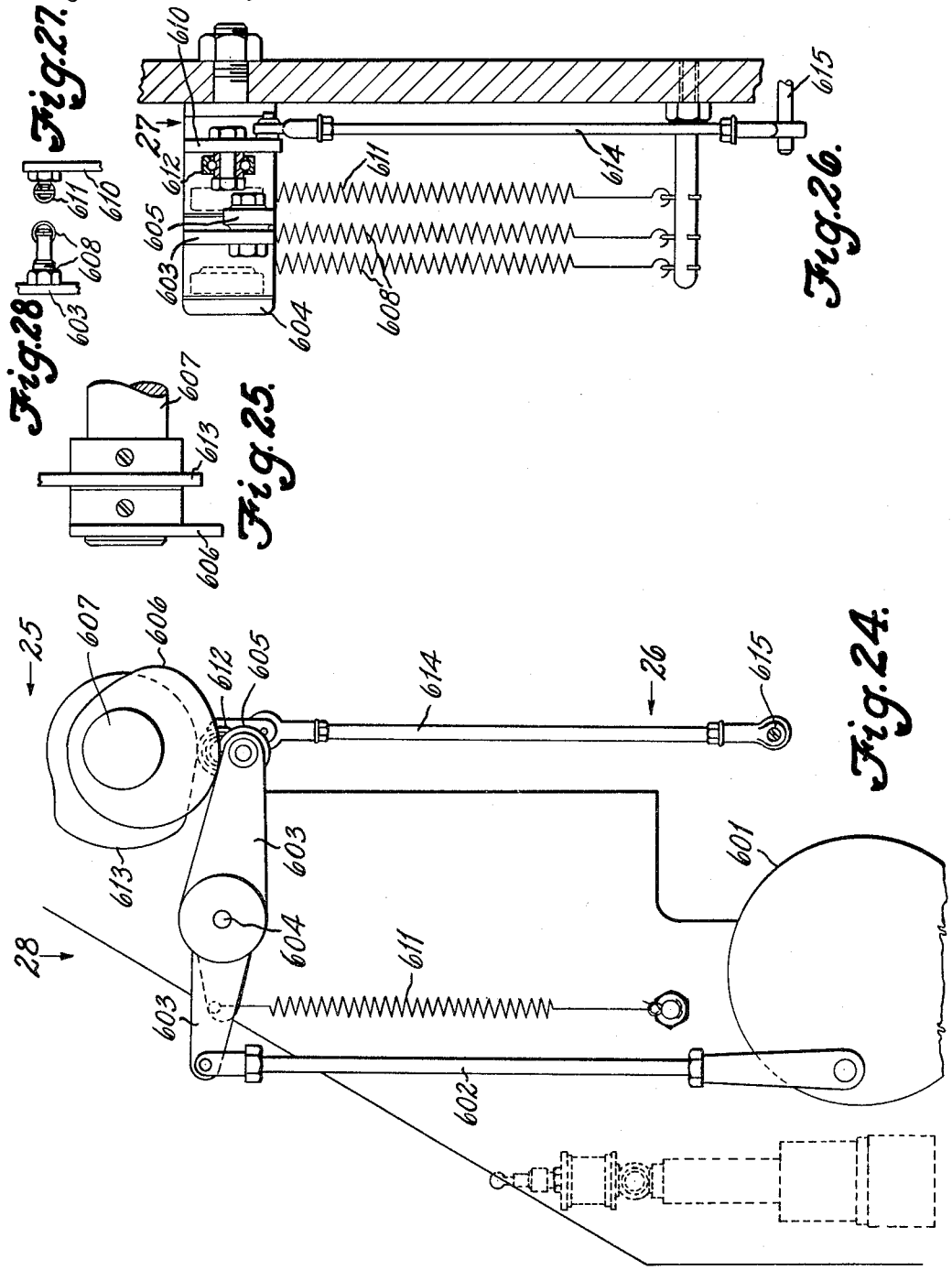

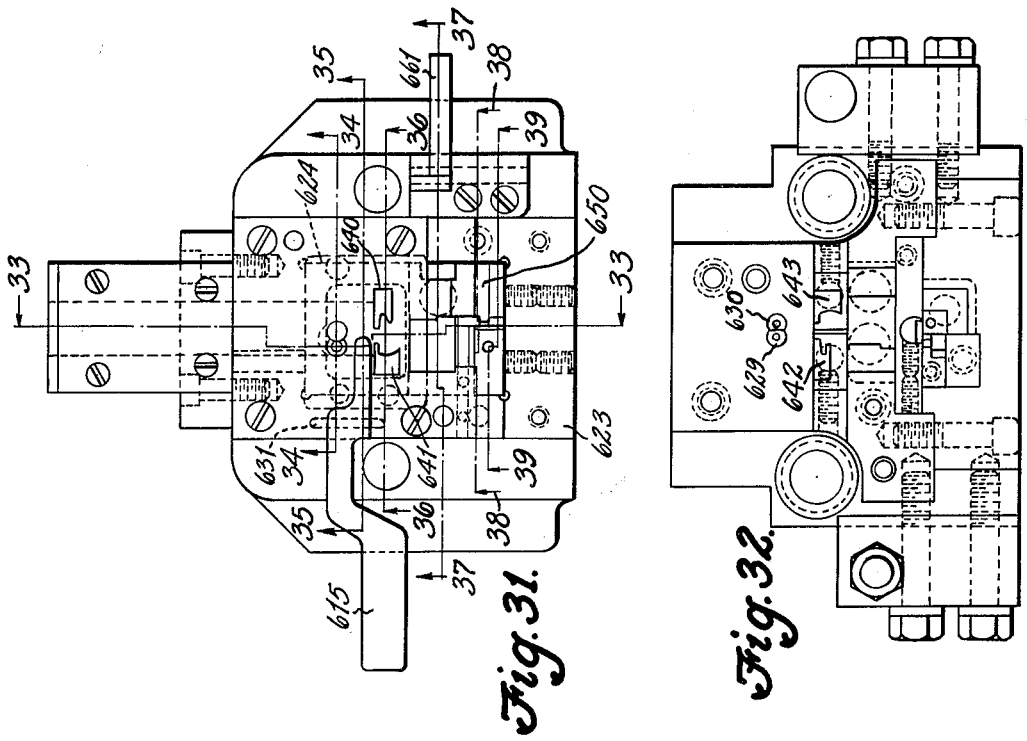
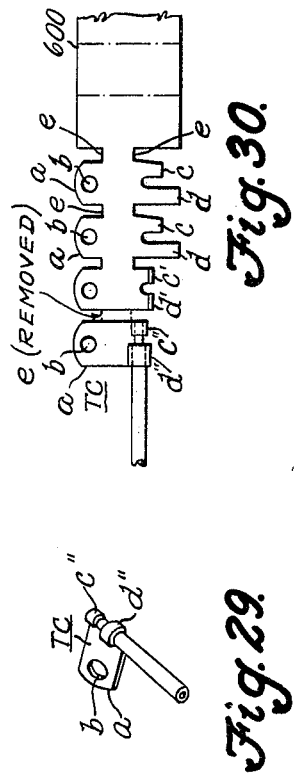
Fig. 31. Fig. 32. Fig. 33. Fig. 30. Fig. 29.
INVENTORS.
JAMES S. BURGE, FLOYD J. FOUST
WILLARD C. SHAW
BY HILTON J. McKEE
WARREN M. RIDER
ATTORNEYS Feb. 28, 1956 J. S. BURGE ET AL 2,736,358
APPARATUS FOR ATTACHING A TERMINAL CLIP TO A WIRE
Original Filed July 29, 1946 18 Sheets-Sheet 17

Inventors
JAMES S. BURGE, FLOYD J. FOUST
WILLARD C. SHAW
HILTON J. McKEE
WARREN M. RIDER By
Attorney Feb. 28, 1956  J. S. BURGE ET AL  2,736,358
APPARATUS FOR ATTACHING A TERMINAL CLIP TO A WIRE
Original Filed July 29, 1946  18 Sheets-Sheet 18

Inventors
JAMES S. BURGE, FLOYD J. FOUST
WILLARD C. SHAW
HILTON J. McKEE
WARREN M. RIDER
By
Attorney United States Patent Office 2,736,358
Patented Feb. 28, 1956

1

2,736,358

APPARATUS FOR ATTACHING A TERMINAL CLIP TO A WIRE

James S. Burge, Floyd J. Foust, Willard C. Shaw, and Warren M. Rider, Anderson, and Hilton J. McKee, Middletown, Ind., assignors to General Motors Corporation, Detroit, Mich., a corporation of Delaware Original application July 29, 1946, Serial No. 686,964. Divided and this application May 24, 1950, Serial No. 163,961

3 Claims. (Cl. 153—1)

This application is a division of our copending application, Serial No. 686,964, filed July 29, 1946 now Patent No. 2,596,396.

This invention relates to the manufacture of electrical condensers and more particularly to an apparatus for making condenser having a foil winding enclosed in a metal can to which one foil of the condenser is electrically connected, the other foil being electrically connected to a wire extending from the can and insulated therefrom.

An object of the invention is to facilitate the attachment of a terminal clip to the condenser lead wire. To accomplish this object, the disclosed embodiment of the invention provides an intermittently operating conveyor having workholders for receiving the condensers and a punch press for forming a terminal clip and attaching it to a condenser wire when the condenser has been conveyed to the clip attaching station. The condensers to which clips are attached to their lead wires are ejected from the conveyor. The machine provides means for operating the conveyor, the press and the condenser ejector in timed relation.

Further objects and advantages of the present invention will be apparent from the following description, reference being had to the accompanying drawings, wherein a preferred embodiment of the present invention is clearly shown.

In the drawings:

Fig. 2 is a rear perspective view of the machine.

Fig. 3 is a diagrammatic plan of the machine.

Fig. 4 is a mechanism diagram of the machine.

Fig. 5 is a view in the direction of arrow 5 of Fig. 4.

Fig. 6 is a rear elevation of the table and conveyor.

Fig. 8 is a sectional view on line 8—8 of Fig. 4.

Fig. 11 is a sectional view on line 11—11 of Fig. 4.

Fig. 11A is a fragmentary view on line 11A—11A of Fig. 11.

Fig. 14 is a sectional view on line 14—14 of Fig. 4.

Fig. 15 is a sectional view on line 15—15 of Fig. 14.

Fig. 16 is a sectional view on line 16—16 of Fig. 5 and arrow 16 of Fig. 19.

Fig. 17 is a sectional view on line 17—17 of Fig. 18.

Fig. 18 is a fragmentary view in the direction of arrow 18 of Fig. 16.

Fig. 19 is a sectional view on line 19—19 of Fig. 4 and in the direction of arrow 19 of Fig. 16.

Fig. 20 is a sectional view on line 20—20 of Fig. 3.

Fig. 21 is a sectional view on line 21—21 of Fig. 3, and in the direction of arrow 21 of Fig. 20.

2

Figure 1:
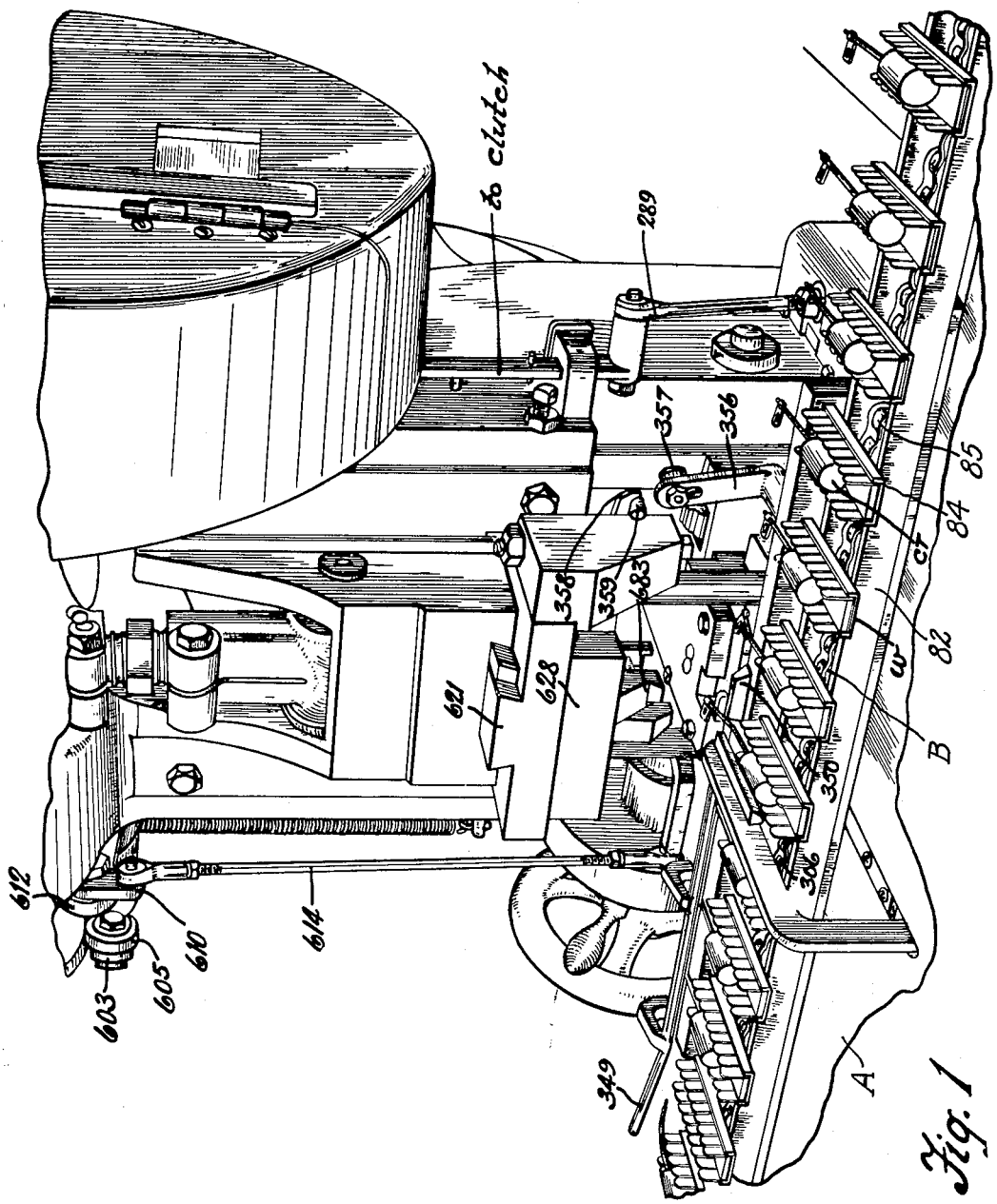
Fig. 1 is a close-up of a portion of the clip forming and attaching press and the conveyor.

Figs. 22 and 23 are sectional views on lines 22—22 and 23—23, respectively, of Fig. 21.

Fig. 24 is a view in the direction of arrow 24 of Fig. 2.

Fig. 25 is a view in the direction of arrow 25 of Fig. 24.

Fig. 26 is a view in the direction of arrow 26 of Fig. 24.

Fig. 27 is a view in the direction of arrow 27 of Fig. 26.

Fig. 28 is a view in the direction of arrow 28 of Fig. 24.

Fig. 29 is a perspective view of a terminal clip TC formed by clip press P.

Fig. 30 is a diagram of the steps performed by the press.

Fig. 31 is a plan (looking down) of lower die of the clip press P.

Fig. 32 is a plan (looking up) of upper die of the clip press; and this view is reversed (left to right) relative to Fig. 31.

Fig. 33 is a sectional view on line 33—33 of Fig. 31.

Figure 34:
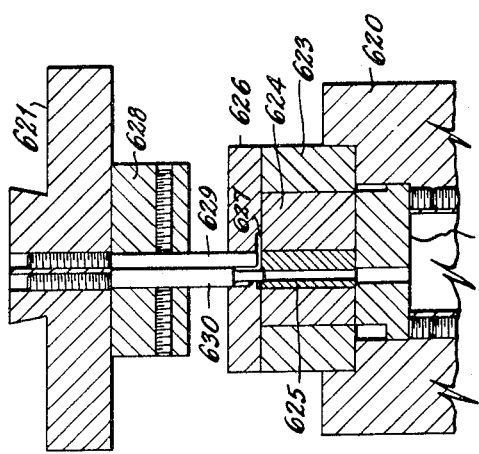

Fig. 34 is a sectional view on line 34—24 of Fig. 31.

Figure 35:
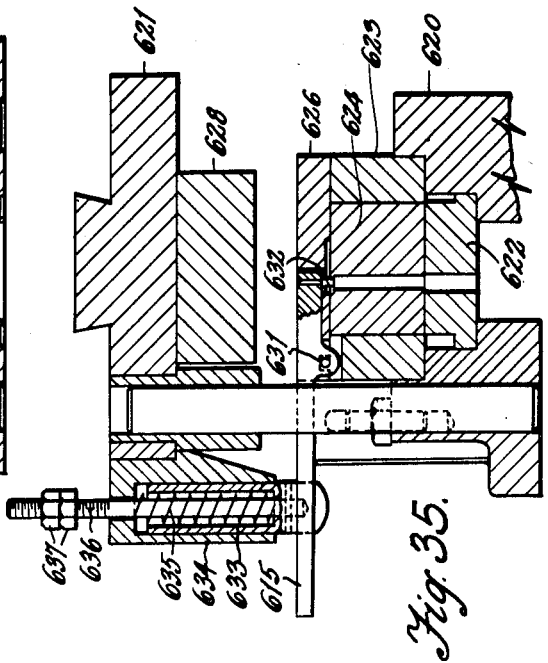

Fig. 35 is a sectional view on line 35—35 of Fig. 31.

Figure 36:
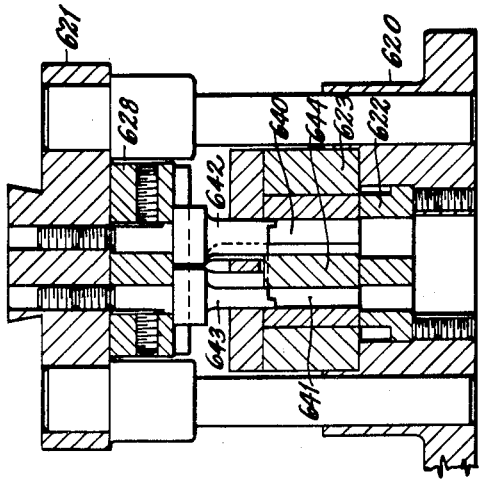

Fig. 36 is a sectional view on line 36—36 of Fig. 31.

Figure 37:
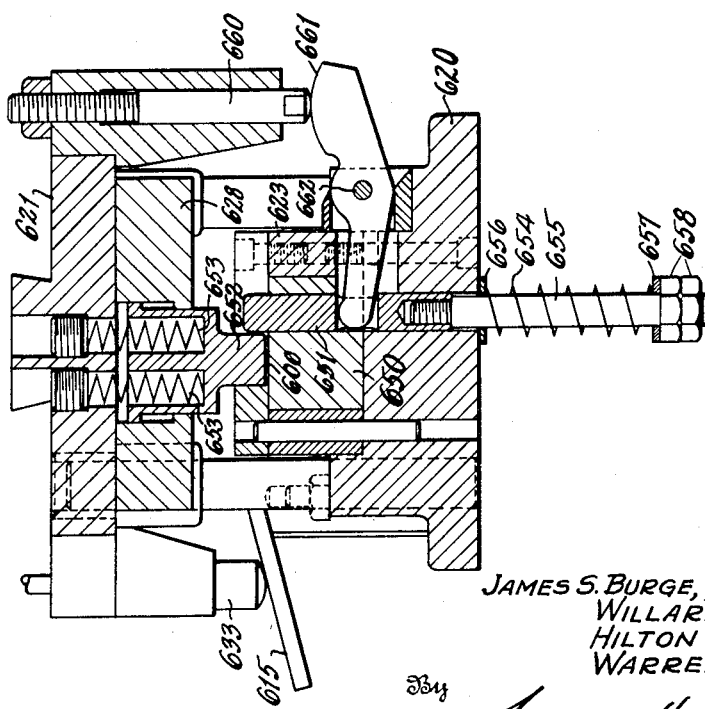

Fig. 37 is a sectional view on line 37—37 of Fig. 31.

Figure 38:
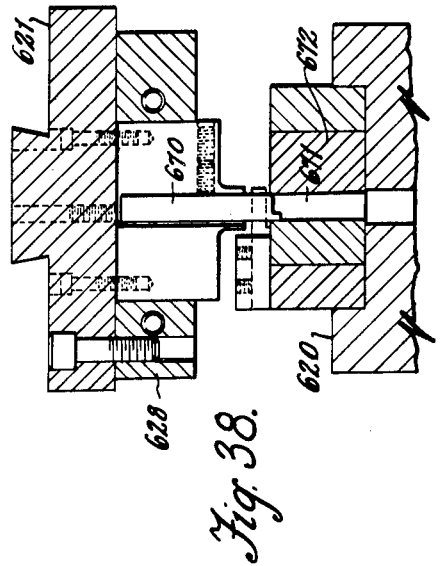

Fig. 38 is a sectional view on line 38—38 of Fig. 31.

Figure 39:
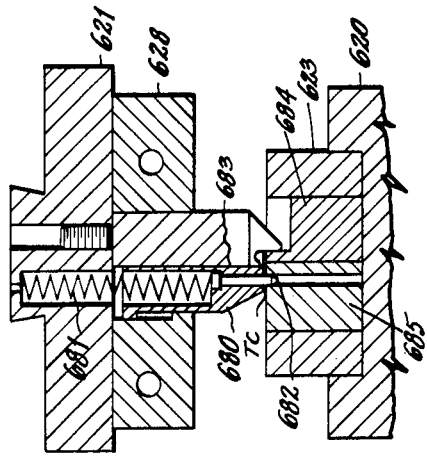

Fig. 39 is a sectional view on line 39—39 of Fig. 31.

Referring to Figs. 1 and 2, the machine comprises a cabinet A which supports a conveyor B carrying workholders $w$ each for receiving a condenser C. Referring to Fig. 2, a conveyor B conveys the condensers from a machine for assembling condensers through a hopper D, the bottom of which is open so that the operator may reach in and place the condensers upon the conveyor B. As the condensers pass left in Fig. 2 and right in Fig. 3 on the conveyor B, the terminal wire $CT_1$ of the condenser is automatically connected with the testing apparatus described in our application Serial No. 686,964 now Patent No. 2,596,396. These condensers which fail to pass the tests are automatically ejected before passing to the clip attaching station. These condensers which pass the test remain on the conveyor which carries them first to a clip attaching station CS where a terminal clip is attached to the condenser wire. The terminal clips are made by a die operated by a punch press P. Then the condensers pass to a welding station WS where the clip is welded to the terminal wire by an electric welder W. At the right end of the cabinet, the condensers are ejected by ejector N.

Referring to Fig. 6, the sheet metal exterior of the cabinet supported by a frame comprising two horizontal channel bars 70 supported above the floor by legs 71 and 72 and plates 73, 74, 76 and 77 by a table 75 which supports also the punch press P. As shown in Figs. 1 and 19, a channel 70 supports angle bars 80 supporting a plate 81 which support rails 82 which support the workholders $w$ comprising a plate 83 slidable along the rails and carrying resilient, condenser retainers 84. The workholders $w$ are attached to links of a conveyor chain 85 which, as shown in Fig. 6, passes around a drive sprocket 86, a slack take-up sprocket 85a, upper idle sprockets 87, lower idle sprockets 88 and an end idle sprocket 89, all of these sprockets being supported by a channel bar 70. Referring to Fig. 11, sprocket 86 is supported by a shaft 90 journalled in bearings supported by the channels 70. To the shaft 90 there is attached a bevel gear 91 meshing with a bevel gear 92 connected with a shaft 93 supported by a bracket 94 attached to a bar 70. Shaft 93 is connected with a sprocket 95 connected by a chain 96 with a sprocket 97 attached to a shaft 117. Chain 96 passes around an idle sprocket 99 supported by a bracket 100 supported by plate 76.

Figure 7:
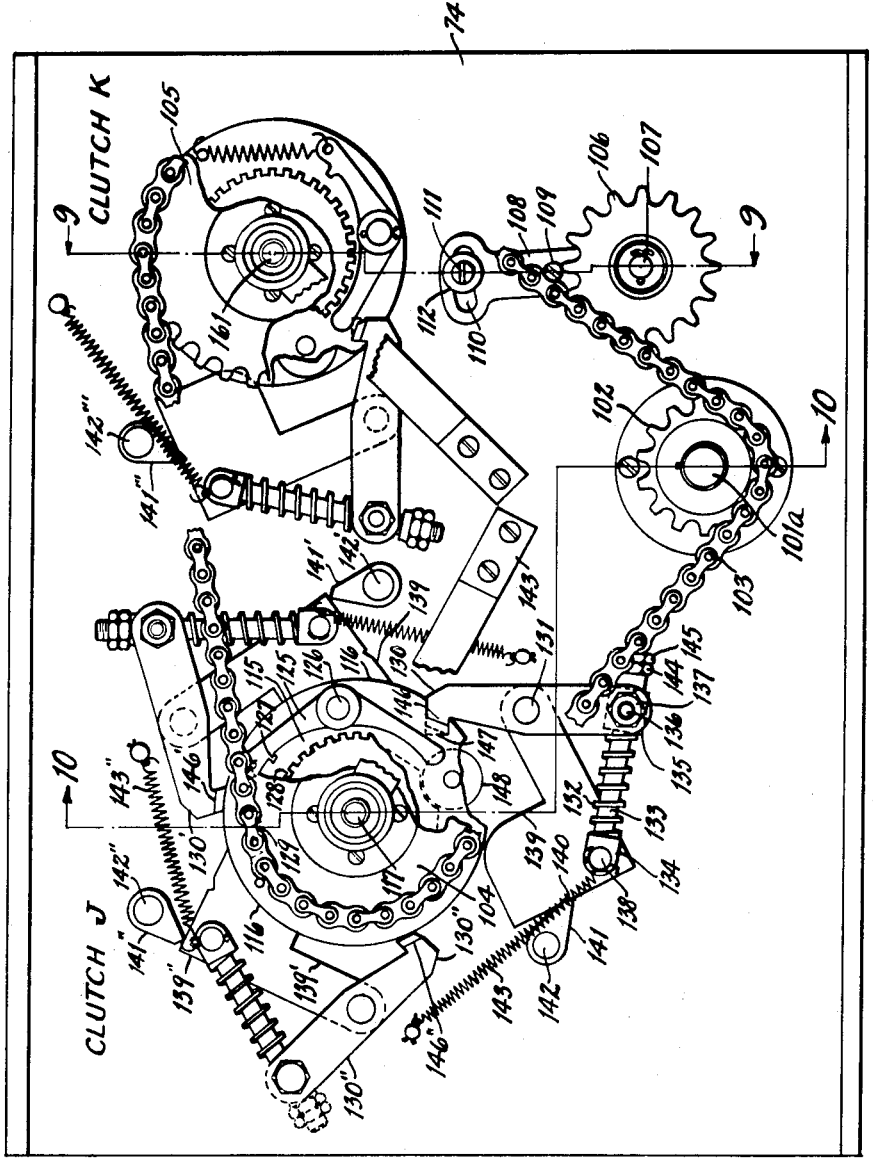
Fig. 7 is a view of a mechanism in the direction of arrow 7 of Fig. 4.

The cabinet of the machine houses an electric motor, not shown, which is operatively connected in any suitable manner with a shaft 101 connected with a shaft 101a journaled in a bearing 101b supported by plate 74 (Fig. 10) and connected with a sprocket 102 (also Fig. 7). A chain 103 passes around sprocket 102 and sprockets 104 and 105 and is engaged by an idle sprocket 106 pivotally supported at 107 by a lever 108 pivoted at 109 having a slot 110 through which passes a clamp screw 111 threaded into the plate 74. Lever 108 is adjusted to take up the slack in chain 103 and it is held in adjusted position by tightening the screw 111 which passes through a clamp washer 112.

Figure 10:
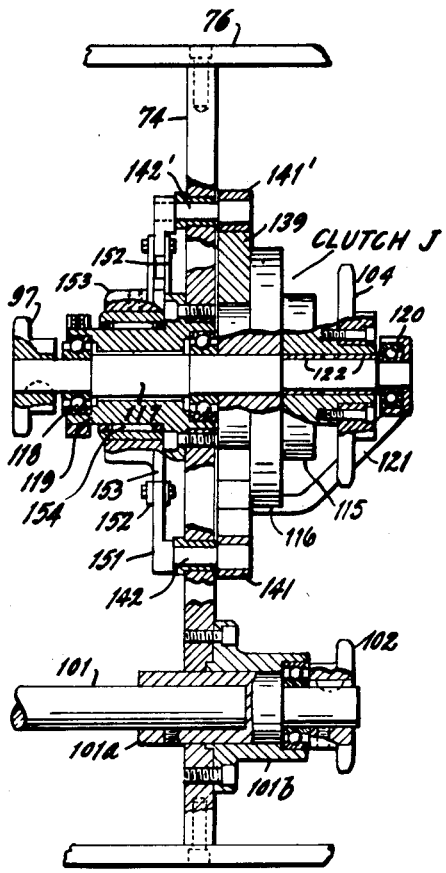
Fig. 10 is a sectional view on line 10—10 of Fig. 7.

Referring to Figs. 7 and 10, sprocket 104 is attached to the hub of a clutch driving member 115 of a one-third revolution clutch J having a driven member 116 keyed to the shaft 117, journaled in bearings 118 supported by a bushing 119 attached to plate 74. Shaft 117 carries the conveyor drive sprocket 97 (Fig. 11). Shaft 117 is journaled in a bearing 120 carried by a bracket 121 supported by plate 74. The hub of the clutch driving member 115 is fitted with bearings 122 which are journaled on the shaft 117.

Referring to Fig. 7, clutch driving member 115 is connected with clutch driven member 116 by lever 125 pivoted at 126 on member 116 and having a tooth 127 for engaging a notch 128 of the driving member 115. When the lever 125 is released for counterclockwise motion about its pivot 126, a spring 129, connecting lever 125 with member 116, causes the lever to connect the clutch members. Lever 125 is prevented from engaging its tooth 127 with a notch 128 by a lever 130 pivoted at 131 upon the plate 74 and urged counterclockwise by a spring 132 which surrounds a rod 133 and which is confined between the eye head 134 of the rod and a block 135 having a screw 136 pivoted on lever 130 and retained by a nut 137. The head 134 is pivoted at 138 on a lever 139 pivoted also on 131. Lever 139 has a notch 140 for receiving a latch pawl 141 attached to a shaft 142 which retains the lever 139 in the position shown against the action of a spring 143 connecting said lever with the plate 74. The right end of rod 133 is threaded to receive a nut 144 which, as shown in Fig. 7, is spaced slightly from the right side of the block 135. Nut 144 is locked in adjusted position by a lock nut 145. Lever 130 has a hook 146 for engaging a notch 147 in member 116. Member 116 supports a pivoted roller 148. To trip the clutch, the latch 141 is retracted by clockwise rotation of shaft 142 and the spring 143 pulls the lever 139 clockwise. Rod 133 moves left carrying with it the nut 144 which pulls on the block 135 and causes the lever 130 to move clockwise to pull the hook 146 out of the notch 147 and thereby allowing the lever 125 to move counterclockwise by the action of spring 129. The clutch members 115 and 116 are then connected and 116 will rotate counterclockwise. If there were but one set of parts numbered 130 through 146, the member 116 would turn one revolution. Toward the end of this movement, the roller 148 engages the lever 139 to move it counterclockwise against the action of spring 143 and to cause, through the action of the spring 132, the lever 130 to be forced counterclockwise against the periphery of member 116. Before the end of the one revolution the pawl 141 is permitted to return by spring to be described to a latching position wherein the lever 139 will be latched as shown in Fig. 7 after the roller 148 passes to the right of it. Therefore, at the end of one revolution, the lever hook 146 will snap into the notch 147 to retain the plate 116 coincidentally with the retraction of the lever tooth 127 from a notch 128 of driving member 115. In order to obtain a partial revolution of the clutch before it is automatically thrown out, for example, one-third revolution, three sets of members, numbered 130 through 146, are provided and the parts of these sets are similar to those described marked with the same reference numerals. The numerals applying to one set have a prime affixed and the numerals applying to the other set have a double prime affixed. It will be seen that the locking levers 130, 130' and 130'' are spaced equi-angularly about the driving member 115. If lever 139 is the first to be tripped, the clutch will rotate counterclockwise one-third revolution and roller 148 will pass under lever 139' to lift it so that it can be retained by lever 139' and will be caught by the latch 141' and the clutch member 116 will be stopped by the engagement with its notch 147 by the hook 146' of lever 130. For the next one-third revolution, the latch 141' is retracted so as to allow the clutch members to be connected for another one-third revolution during which the roller 148 will engage the lever 139'' which will result in the engagement by the member 116 with the hook 146'' of lever 130''.

Figure 9:
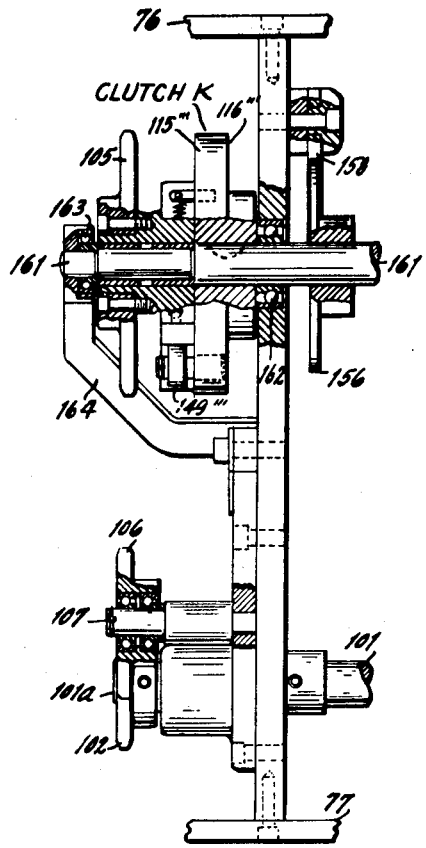
Fig. 9 is a sectional view on line 9—9 of Fig. 7.

The three latches 141, 141' and 141'' are connected by shafts 142, 142' and 142'', respectively, which, as shown in Fig. 8, are attached to levers 151, 151' and 151'' connected by links 152, 152' and 152'' with a plate 153 which, as shown in Fig. 10, is journaled on roller bearings 154 supported by the bushing 119. Plate 153 is urged by a spring 155 counterclockwise so that the shafts 142, 142' and 142'' are urged clockwise in Fig. 8 or counterclockwise in Fig. 7 so as to urge the latching pawls into latching position. Plate 153 is rotated clockwise by a cam 156 engageable with a roller 57 carried by a lever 158 pivoted at 159 and connected with lever 153 by a link 160. Cam 158 is driven by a cam shaft 161 which, as shown in Fig. 9, is journaled in a bearing 162 supported by plate 74 and a bearing 163 supported by a bracket 164 attached to plate 74. Sprocket 105, which is journaled loosely on the shaft 161, is connected therewith through a one-revolution clutch K of the same construction as the clutch J except that there is only one set of parts like those numbered 130 through 146. The parts of clutch K, which are like those of clutch J, are indicated by the same numerals but with a triple prime affixed.

The latch pawl 141''' attached to shaft 142''' is controlled by a pedal 165 (Fig. 20) pivoted at 166 connected by a link 167 with a lever 168 pivoted at 169 connected by a link 170 with a lever 171 attached to a shaft 172 connected with a lever 173 connected by a link 174 (Fig. 12) with a lever 175 pivoted at 176 and connected by a link 177 with a lever 178, (see also Fig. 8) connected with shaft 142'''. Therefore, by depressing the pedal 165, the clutch K will be continuously tripped and cam shaft 161 will continuously rotate. Each time shaft 161 makes one revolution, clutch J is tripped but it automatically throws out at the end of one-third revolution so that the conveyor will be driven intermittently while the cam shaft rotates continuously until pedal 165 is released.

Figs. 20 and 21 show a bar 480 mounted on the upper end of a shaft 481 which is supported in a bearing 482 attached to a cover plate 483 and in a bearing 484 provided by a plate 485. The bar 480 is held in a normal position by a spring 486 attached to the cover 483 and to a lever 487 attached to the shaft 481. Spring 486 urges lever 487 against a lever 488 on shaft 172. When pedal 165 is depressed, lever 488 on shaft 172 moves down (Fig. 22) and allows lever 487 on shaft 481 to move left (Fig. 22) or up (Fig. 23) by the action of spring 486 until the lever 487 strikes shoulder 488a of lever 488. This causes the pedal 165 to be held in depressed position so that the machine will operate until the operator at the left end of the machine moves the stopping lever 480 attached to shaft 481. So long as the pedal 165 is held down, the cam shaft 161 will turn one revolution and then stop; and while the cam shaft 161 is at rest, the conveyor B moves the workholders w a distance equal to the spacing of the workholders.

Figure 12:
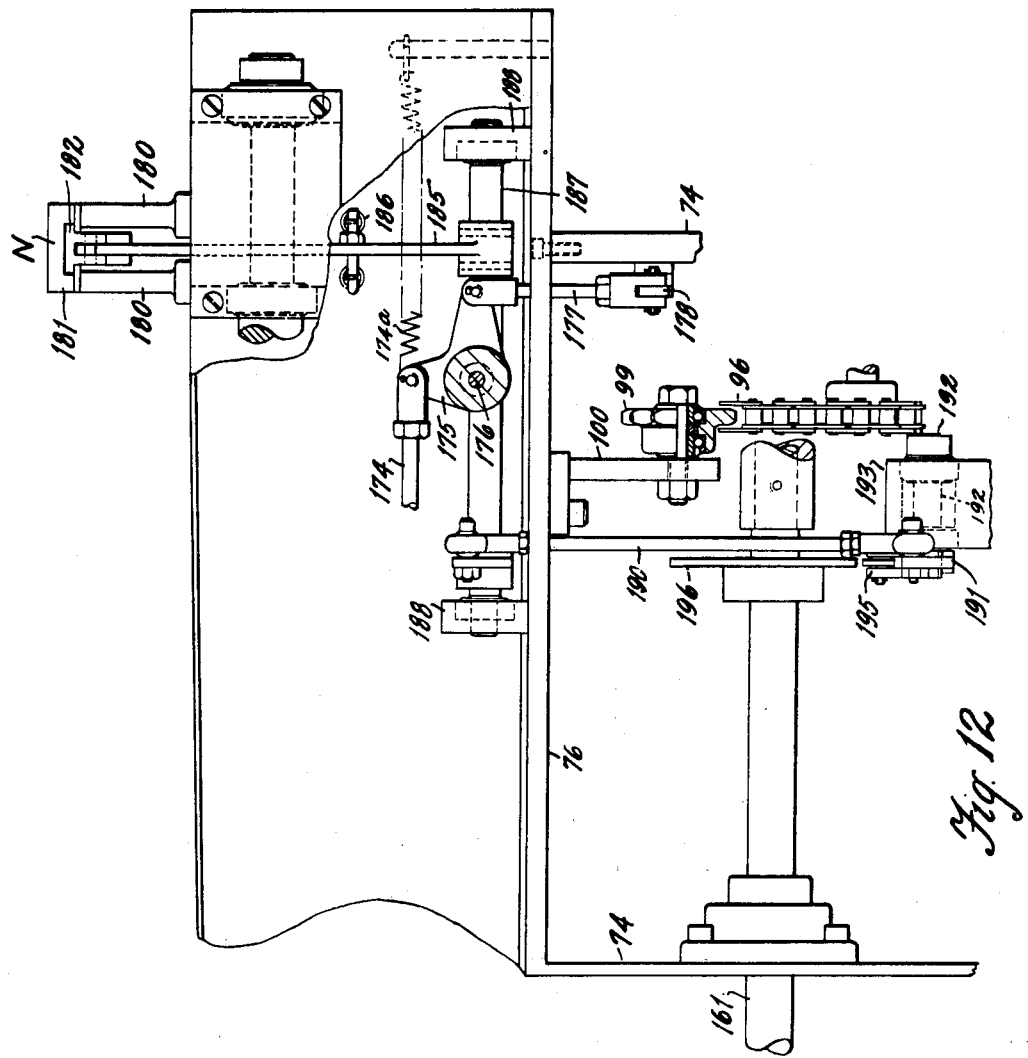
Fig. 12 is a sectional view on line 12—12 of Fig. 11.

Fig. 11, which is a sectional view at 11—11 of Fig. 4, shows ejector N for ejecting the completed condensers from the conveyor workholder. Posts 180 supported by channels 70 support rails 181 for a slide 182 having a condenser cam pusher 183. Bar 182 is operated by a lever 185 urged clockwise (Fig. 11) by spring 186 and attached to a shaft 187 journaled on brackets 186 (Fig. 12) and carrying a lever 189 connected by link 190 with a lever 191 attached to a shaft 192 journaled in a bracket 193 (Figs. 11A and 12). Lever 191 carries a roller 195 for engaging a cam 196 driven by shaft 161.

Figure 13:
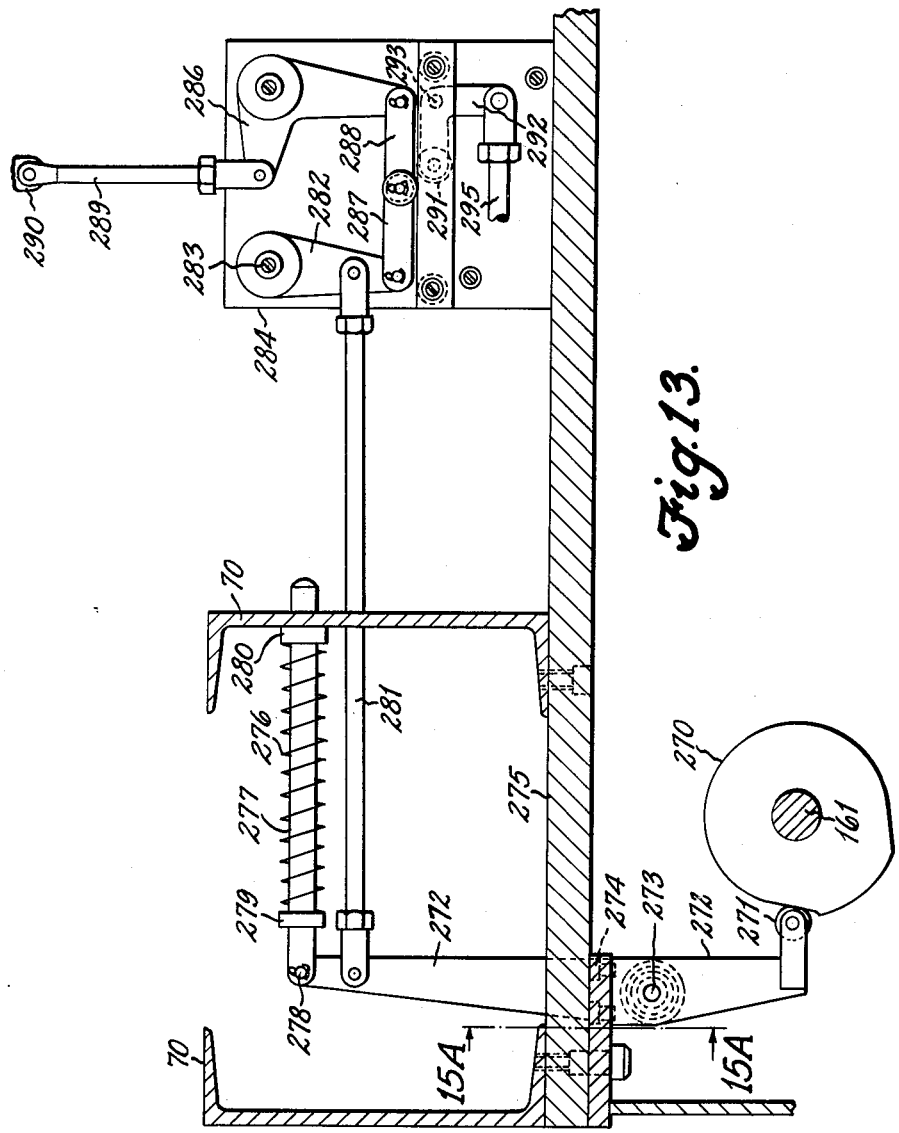
Fig. 13 is a sectional view on line 13—13 of Fig. 4.

Fig. 13, which is a sectional view on line 13—13 of Fig. 4, shows a cam 270 driven by shaft 161 and engaging a roller 271 carried by a lever 272 pivoted at 273 on a bracket 274 attached to a plate 275 forming the top of table 75 for the clip press P. Lever 272 is urged counterclockwise by a spring 276 surrounding a rod 277 attached at 278 to the lever 272 having a shoulder 279 against which the spring 276 bears, the other end of the spring bearing against a bushing 280 carried by the channel 70 through which the rod 277 extends. Lever 272 is connected by a link 281 with a lever 282 pivoted at 283 on a plate 284 and providing a pivot 285 for a lever 286. Levers 282 and 286 are connected by toggle links 287 and 288 which, if permitted to straighten as shown in Fig. 13, will transmit counterclockwise movement of lever 282 to lever 286 in order to effect upward movement of a link 289 connected with a bar 290 which controls the clutch of the punch press. The toggle links are under control by a roller 291 which, as shown in Fig. 14 (section on line 14—14 of Fig. 4), is carried by a lever 292 pivoted at 293 on plate 284 and connected by a link 295 with a lever 296 fixed to a shaft 297 journaled in bearings 298 fixed to channel 70. Shaft 297 operates a lever arm 299 connected by a link 300 with a lever 301 pivoted at 302 on a bracket 303 attached to a channel 70. Lever 301 is urged down by a spring 305 so as to bring a bar 306 carried by lever 301 to contact with a condenser in workholder w. If the condenser is present, then lever 301 will not move down so far as to move roller 291 up far enough to break the toggle links 287, 288. Therefore, the rod 281 when moving right will cause the punch press clutch to be tripped. However, if the condenser is not present in the workholder, the lever 301 will move down so far that the roller 291 will move up so far that the toggle links 287, 288 will be broken and the link 281 cannot cause the bar 290 (Fig. 13) to move down to trip the clutch of the punch press. Downward movement of the lever 301 is limited by a stop screw 307 carried by a post 308 attached to the plate 275. The lowering of bar 306 upon a condenser in workholder w is under control by a cam 310 driven by shaft 161 and engageable with a roller 311 carried by a lever 312 pivoted at 313 on a bracket 314 attached to plate 275 and connected by a link 315 with the lever 301.

Fig. 19, which is a sectional view on line 19—19 of Fig. 4, shows a cam 330 driven by shaft 161 and engageable with a roller 331 carried by a lever 332 pivoted at 333 on a bracket 334 attached to the plate 275. Lever 332 is connected by a link 335 with a lever 336 attached to a shaft 337 journaled in bearings 338 and 339 carried by the channels 70. Shaft 337 carries an arm 340 which springs 341 attach to a post 342 carried by plate 275 whereby the levers 336, 340 and a lever 345 also attached to shaft 337 are urged clockwise (Fig. 16). Lever 345 operates a condenser lead locator at the terminal clip attaching station CS (Fig. 3).

The terminal lead locator at CS comprises a bar 346 attached to a conveyor rail 82 by screws 347 and spacers 348 and supporting a condenser-lead-guide bar 349 which, as the conveyor moves, causes the condenser leads to be brought successively against a locating block 350 supported by bars 346 for horizontal sliding movement and urged left by a spring 351 until pin 352 strikes the left end of a notch 353 in the bar 346. After the condenser lead wire at o strikes the block 350, it is clamped against the block by a finger 354 which swings on a pin 354c which is slidable through a horizontal slot 354d in bar 346 and which is connected by a link 355 with lever 345.

Finger 354 has an inclined surface 354a and a (normally) horizontal surface 354b. Both surfaces are engageable with a pin 354e. Spring 341 actuates finger 354 up and right to pinch the condenser lead against the locating block 350 which yields slightly to the right as spring 341 causes slight compression of spring 351 (Fig. 17).

After the terminal clip is attached to the condenser lead-wire by downward operation of the punch press head, it is necessary to lift the lead-wire with clip attached to a position above the block 350 before the next right movement of the conveyor. During upward movement of the press head this is effected by an arm 356 pivoted at 356a and carrying a roller 357 for engagement by a cam finger 358 (Fig. 1) carried by the press head. Finger 358 is pivotally supported by the press head and it gravitates against a pin 359. When the press head descends, the finger 358 swings up and clears the roller 357 without effecting any movement thereof.

*Terminal clip punch press*

Referring to Fig. 2, strip metal 600 is fed from supply roll into the press P by a pair of feed rolls (not shown) by a ratchet mechanism 601 (also Fig. 24) which is oscillated by a link 602 attached to a lever 603 journaled on bearings supported by stud 604 and carrying a roller 605 for engaging a cam 606 operated by the punch press crank shaft 607. Spring 608 urges the lever 603 counterclockwise.

A lever 610 pivoted on stud 604 is urged counterclockwise by spring 611 to urge a roller 612 thereby into contact with a cam 613 also driven by shaft 607. Lever 610 is connected by a link 614 with a lever 615 of the terminal clip die.

The dies form a terminal clip TC as shown in Fig. 29 according to the method shown in Fig. 30.

The punch press dies include a lower fixed plate 620 (Fig. 34) and an upper plate 621 attached to the punch press plunger. Plate 620 supports a block 622 and a block 623 enclosing a die holder 624 containing a die 625 and covered by plate 626 having a groove 627 through which the metal strip 600 passes. The upper plate 621 supports a block 628 carrying a stamping punch 629 and a hole-piercing punch 630. At the section on line 34—34 of Fig. 31, a hole is formed by the cooperation of dies 625 and 630 and the punch 629 stamps an identification mark on the metal strip.

Fig. 35 shows the strip locating station of the dies at section on line 35—35 of Fig. 31. The lever 615 operated by the cam 613 (Fig. 24) is pivotally supported by pin 631 confined between the block 623 and the plate 626 and carries a stud 632 which is received by the hole pierced by the punch 630 (Fig. 34) in the metal strip. Lever 615 is urged down by a plunger 633 guided by part 634 attached to upper die support 621. A spring 635 which surrounds a rod 636 is confined between the plunger 633 and part 634. Nuts 637 threaded on rod 636 limit downward movement of the plunger 633 by the spring 635.

Fig. 36, which is the section on line 36—36 of Fig. 31, shows that the die block 644 is provided with punch receiving holes 640 and 641 for receiving punches 642 and 643 respectively, attached to the block 628. The shape of the holes 640 and 641 is shown in Fig. 31 and of the punches 642 and 643 in Fig. 32 which is the bottom view of the upper die assembly shown in Fig. 33. In Fig. 31, the die opening 640 is shown on the right of the center line and the punch 642 is shown on the left of the center line in Fig. 32. These punches shape the strip 600 as shown in Fig. 29 to provide a tab a having a hole b, a short tab c to be formed as shown at c" (Fig. 29) around the bare end of the condenser wire CT₁ and a longer tab d to be formed as shown at d" around the insulation of the wire. There is a neck e joining the section of the strip 600.

The tab bending station is shown in Fig. 37 which is a sectional view on line 37—37 of Fig. 31. Here a die block 650 provides a guide for a bending plunger 651 which bends the tabs into positions c' and d' (Fig. 30) alongside a pressure block 652 supported by the upper die plate 628 and urged down by springs 653. Normally the plunger 651 is urged down by spring 654 surrounding a rod 655 attached to the plunger. Spring 654 is confined between a washer 656 bearing against the lower die plate 620, and a washer 657 retained by nuts 658 threaded on the rod 655. As the upper die support 621 descends, a rod 660, carried thereby, engages a lever 661 pivoted at 662 to cause it to lift plunger 651.

The strip severing station is shown in Fig. 38, which is a section at 38—38 of Fig. 31. At this station, a punch 670 cooperates with a die hole 671 in block 672 to sever the strip at the neck e, Fig. 30.

The station at which the terminal clip is attached to the wire extending from the condenser is shown in Fig. 39, which is a sectional view on line 39—39 of Fig. 31. At this station, a pressure plunger 680 supported by the upper die is urged by spring 681 against the clip TC while a pin 682 carried by a plunger extends through the hole in the clip and a hole in block 685. A plunger 683 bends the tabs from positions c' and d', respectively, into positions c'' and d'' (Fig. 29) around the wire and the wire insulation.

Referring to Fig. 3, the operator at the loading station takes a condenser CT and holds it with its lead wire CT₁ extending toward a lead aligning plate 900. The lead wire being straight and its end touching the plate 900, the operator presses the condenser CT into a workholder w. Thus the lead wire ends are lined up for attachment thereto of the terminal clips made by the punch press P.

While the embodiment of the present invention as herein disclosed constitutes a preferred form, it is to be understood that other forms might be adopted.

What is claimed is as follows:

1. A machine for operating on an electric wire extending from an electrical device the combination comprising; a holder for said device, detecting means operable to detect the presence of the device in said holder, a pair of members forming a longitudinal slot therebetween adopted for guiding a terminal end of a wire extending from said device transversely along said slot, a locating block against which the wire of the device when at the station is pressed to locate it in proper position to receive a clip, a holding means effective only after said wire is against said block for holding said wire in position against the block, applying means for attaching a clip to the terminal end of the wire while in position against said block, ejecting means for removing the wire from the holding means, subsequent to the application of said clip and timing means dependent upon the operation of the detecting means for operating all of the above means in sequential relation.

2. The feeding device as set forth in claim 1, wherein the detecting means comprises in combination a bar movable into contact with a surface of the device, timing means to move the bar, and connecting means for joining the bar to the applying means, said connecting means including toggle links normally aligned so as to transmit motion from the operating means to the applying means in which the means operated by the bar when the device is absent causes disalignment of the toggle links thereby rendering the connecting means inoperative.

3. A machine for operating on an electric wire and for attaching a clip to the terminal end thereof the combination comprising; a pair of members adapted to form a longitudinal slot therebetween for guiding a terminal end of a wire extending from said device transversely therealong, a locating block against which the wire of the device when at the station is pressed to locate it in proper position to receive a clip, normally ineffective holding means effective only after wire is against said block for holding the wire in said position, means for applying a clip to a terminal end of the wire while said holding means are effective, ejecting means for removing the wire from the holding means, subsequent to the application of said clip when said holding means is ineffective and timing means for operating all of the above means in sequential relation.

References Cited in the file of this patent

UNITED STATES PATENTS

| | | |
|---|---|---|
| 1,873,125 | Holmes et al. | Aug. 23, 1932 |
| 2,082,080 | Palucki | June 1, 1937 |
| 2,339,410 | Keller | Jan. 18, 1944 |
| 2,409,147 | Neuhaus et al. | Oct. 8, 1946 |
| 2,534,867 | Hennessey | Dec. 19, 1950 |